March 25, 1969  A. E. REIKES  3,434,616

PALLET BIN HARDWARE

Filed Feb. 17, 1967

INVENTOR.
ALEX E. REIKES

BY Gregg & Stidham
ATTORNEYS

United States Patent Office 3,434,616
Patented Mar. 25, 1969

3,434,616
PALLET BIN HARDWARE
Alex E. Reikes, 212 Hillview Ave.,
Los Altos, Calif. 94022
Filed Feb. 17, 1967, Ser. No. 616,821
Int. Cl. B65d 9/38, 61/00, 63/06
U.S. Cl. 217—69                    2 Claims

ABSTRACT OF THE DISCLOSURE

Hardware for use in the construction of pallet bins, which hardware is formed with combination abutment and reinforcing members in the form of raised beads or ribs.

---

This invention relates to apparatus for use in forming a pallet bin and more particularly relates to hardware including a corner member and a clip for securing bin side walls together and to a pallet, respectively.

In the fruit picking industry the use of field boxes for receiving fruit is being displaced by bins constructed as an integral part of a pallet. Such bin has the advantage that it may be picked up and transported by the use of a vehicle, such as a fork lift truck. Because bins of this type are subjected to rough usage and handling in the field, they must be extremely sturdy. Moreover, they are desirably of an inexpensive construction and free from protrusions that cause injury to workmen.

An object of this invention is to provide a clip for securing upstanding side walls to a pallet so as to form a rugged pallet bin. A metal clip is affixed to the side wall panel and is bent on the lower end thereof to firmly embrace the pallet. The clip is formed with integral raised ribs which reinforce the same and which serve as abutments to space adjacent bins during use and in storage.

Another object of this invention is to provide a clip that is of rugged construction yet relatively inexpensive to construct. Attainment of this object is important to minimize the initial cost of the bins and is secured by a clip constructed of relatively thin sheet material that is formed, as by well known punching and bending operations, with integral reinforcing ribs which add to the rigidity and strength of the thin sheet metal clip.

Still another object of this invention is to provide pallet bin hardware that protects wooden parts from damage. The edges of the metal hardware parts of the typical pallet bin may become torn and bent in use, and protruding metal parts may gouge into the wooden walls of adjacent bins when the bins are placed together, thereby damaging the same. The hardware of the present invention, which includes clips for securing upstanding side walls to a pallet, right angle corner members, post covers and post anchors, and the like, is formed with raised beads or ribs which extend from the face and over the corners thereof, which ribs strengthen the hardware and pallet bins constructed therewith, and serve as abutments to space adjacent bins to reduce damage as by gouging.

These and other objects will be more apparent after referring to the following specification and accompanying drawings in which.

Figure 1:
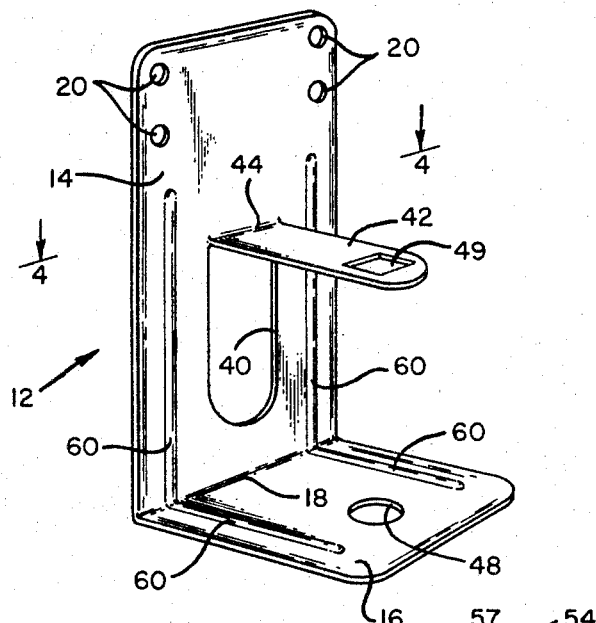
FIGURE 1 is a perspective view of a preferred clip of the present invention.

Referring now to the drawings, reference numeral 12 indicates generally a clip body embodying this invention which is formed from relatively thin material such as a plate of 14- or 16-gauge steel. The clip body 12 has a vertical leg 14 and a horizontal leg 16 bent at 18 to be perpendicular or normal to the vertical leg. Vertical leg 14 is considerably longer than horizontal leg 16 and has formed in the top portion thereof a plurality of holes 20 to receive nails, screws, rivets, or similar headed elongated fasteners 21.

Fasteners 21 extend into a panel 26 that forms a side wall of the bin thus to secure vertical leg 14 of clip 12 on the exterior surface of the panel. The lower edge of panel 26 rests upon pallet bottom wall 28 which is supported in spaced relation to a floor or other horizontal surface by stringers 30, 32 and 34. As will be appreciated by those skilled in the art, the space between bottom wall 28 and the floor on which the stringers rest permits entry of the tines of a fork lift truck under the pallet for moving the bin about.

Horizontal leg 16 of clip 12 extends along the lower surface of stringer 32. The end of stringer 32 can be formed with a rabbetted portion 36 to receive the horizontal leg 16, or the horizontal leg can be secured to the main lower surface of the stringer. The width of clip 12 is approximately equal to the transverse thickness of the stringer 32, and therefore protects the end grain of the stringer from splitting should the bin be inadvertently dropped.

Figure 3:
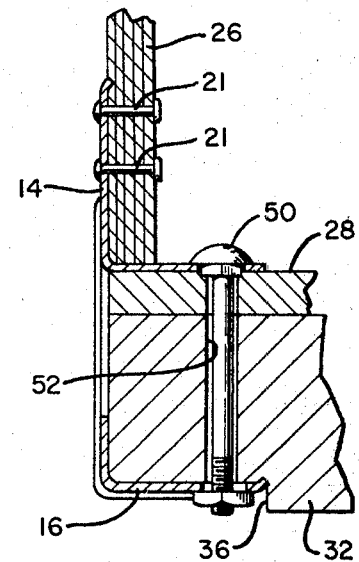
FIGURE 3 is a fragmentary cross sectional view of the improved clip in position on a bin, taken substantially along line 3—3 of FIGURE 2.

Clip 12 is formed in the central region thereof with a cut-out portion 40 from which is bent out a central clip leg 42 along line 44. Bend line 44 is spaced from bend line 18 by an amount approximately equal to the sum of the height of rabbetted stringer 32 and the thickness of bottom wall 28. Therefore, the clip tightly embraces the pallet between leg 42 and horizontal leg 16. Horizontal leg 16 and leg 42 are provided with aligned holes 48 and 49 adjacent the ends remote from the clip body which permit a headed elongated fastener 50 to extend through the legs and through a hole 52 through the bottom wall 28 and stranger 32 of the pallet to secure the legs to the pallet. In FIGURE 3 the fastener is shown comprising a carriage bolt. Of course, the clip of the present invention can be installed along all four sides of the bin.

Figure 5:
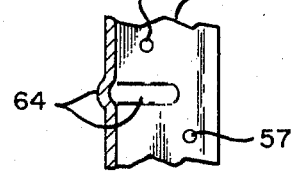
FIGURE 5 is a fragmentary cross sectional view of a novel corner member taken substantially along line 5—5 of FIGURE 2.
Figure 2:
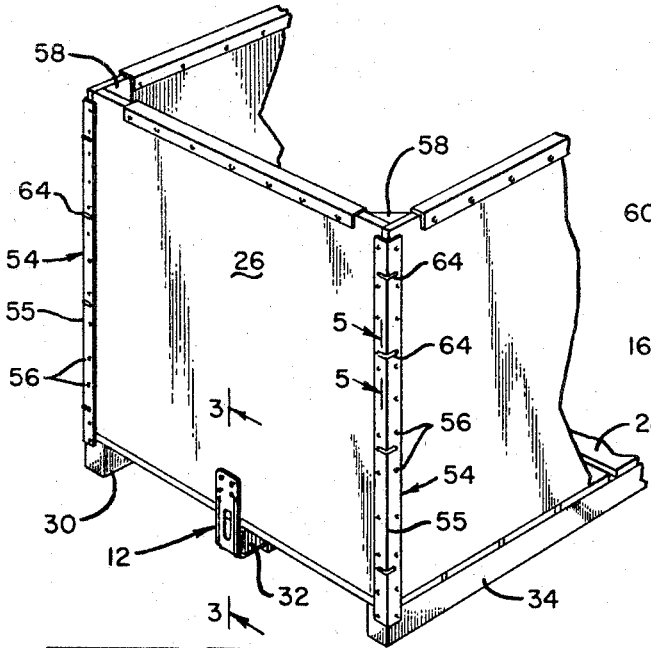
FIGURE 2 is a fragmentary perspective view of a fruit bin utilizing the clip of the present invention.
Figure 4:
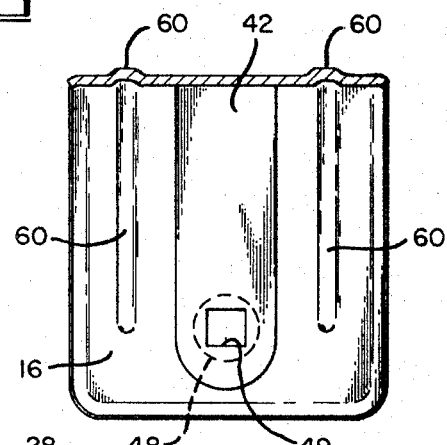
FIGURE 4 is a cross sectional view of the preferred clip taken on line 4—4 of FIGURE 1.

The pallet bin shown in FIGURE 2 includes corner members 54 comprising generally right angle members which are bent along line 55 and are attached to the bin side walls by fasteners 56 such as nails, or the like extending through holes 57 in the angle members (see FIGURE 5). Posts 58 of triangular cross section are located at the inside corners of the bin into which the nails 56 may extend. In the construction of some bins, corner post caps and corner post anchors are employed at the opposite ends of the posts, no such caps or anchors being shown in the drawings.

In accordance with this invention, the pallet bin hardware, including the illustrated clip 12 and corner members 54 (and the corner post caps and anchors not shown) is formed with combination abutment and reinforcing members. In the illustrated arrangement the clips 12 are shown formed with ribs 60 which extend along the vertical leg 14 and the horizontal leg 16 of the clip. A pair of parallel extending ribs are shown on the clip, with the ribs on the vertical leg 14 extending adjacent to and along the entire length of the cut-out portion 40. The ribs may be simply formed during the manufacturing process. Similarly, the angle corner members 54 are formed with ribs 64, which extend transversely thereof. With both the clip 12 and corner members 54, the ribs extend over the corners 18 and 55, respectively, and terminate a spaced distance from the free edges thereof. Not only do the ribs stiffen and strengthen the hardware, but because they extend outwardly, they also serve as abutment members to increase slightly the spacing between the walls of adjacent bins when the bins are placed adjacent to each others. This additional spacing reduces damage to the wooden bin walls caused by torn and/or bent hradware.

In conclusion, the hardware of this invention provides high strength attachment of the pallet bin parts. The hardware is made at extremely low cost. The protruding ribs strengthen and stiffen the hardware, and serve as abutment or stop members to increase slightly the spacing between the pallet bin and adjacent bins or other members.

I claim:

1. A bin having a bottom formed by a pallet that includes a plurality of parallel spaced apart stringers, and a generally rectangular bottom closure means affixed to said stringers, upstanding sidewall panels extending upwardly from the periphery of the pallet, a clip attaching each said sidewall panel to said pallet and comprising an elongated strap having one longitudinal end portion bent at a right angle to the strap and extending along a lower surface portion of a stringer, means securing each strap to the respective sidewall panel at the end remote from said bent portion, each said strap being formed with a bent out portion intermediate said ends parallel with and spaced from said bent end portion by an amount sufficient to embrace said stringer and said bottom closure means, means securing each of said bent portions to said pallet, and a pair of outwardly directed ribs formed on each strap at opposite sides of the bent out portion and along said bent end portion, the ribs adjacent the bent out portion comprising combination abutment and reinforcing members for spacing the bin from adjacent bins, and to stiffen the clip, respectively.

2. The bin as defined in claim 1 including angle corner members formed with a longitudinal bend and attached to the outside corners of adjacent sidewall panels, means forming raised ribs at longitudinally spaced distances along the corner members which extend across the bend therein.

References Cited

UNITED STATES PATENTS

| | | | |
|---|---|---|---|
| 801,113 | 10/1905 | Sisley | 217—69 XR |
| 1,136,027 | 4/1915 | Marquardt | 217—5 |
| 1,968,042 | 7/1934 | Johnson | 217—5 |
| 2,496,965 | 2/1950 | Swingle | 217—69 XR |
| 3,342,364 | 9/1967 | Bingham et al. | 217—69 |

RAPHAEL H. SCHWARTZ, *Primary Examiner.*